US 10,425,255 B2

(12) United States Patent
Obara et al.

(10) Patent No.: US 10,425,255 B2
(45) Date of Patent: Sep. 24, 2019

(54) ESTIMATION DEVICE

(71) Applicant: NTT DOCOMO, INC., Tokyo (JP)

(72) Inventors: Tatsunori Obara, Tokyo (JP); Satoshi Suyama, Tokyo (JP); Tatsuki Okuyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/083,022

(22) PCT Filed: Mar. 9, 2017

(86) PCT No.: PCT/JP2017/009376
§ 371 (c)(1),
(2) Date: Sep. 7, 2018

(87) PCT Pub. No.: WO2017/155016
PCT Pub. Date: Sep. 14, 2017

(65) Prior Publication Data
US 2019/0097843 A1 Mar. 28, 2019

(30) Foreign Application Priority Data
Mar. 11, 2016 (JP) .................. 2016-048757

(51) Int. Cl.
*H04L 25/02* (2006.01)
*H04B 7/0413* (2017.01)
(Continued)

(52) U.S. Cl.
CPC ....... *H04L 25/0212* (2013.01); *H04B 7/0413* (2013.01); *H04B 7/10* (2013.01);
(Continued)

(58) Field of Classification Search
CPC . H04B 17/02; H04B 1/06; H04B 7/00; H04B 7/10; H04L 25/0212; H04N 7/0413
See application file for complete search history.

(56) References Cited

U.S. PATENT DOCUMENTS 9,219,629 B1* 12/2015 Sun ..................... H04L 25/0206
2001/0021181 A1* 9/2001 Choi ................... H04B 7/0617
370/342

(Continued)

FOREIGN PATENT DOCUMENTS

EP 1158716 A2 11/2001
EP 1158716 A3 5/2004
(Continued)

OTHER PUBLICATIONS

International Search Report issued in PCT/JP2017/009376 dated May 16, 2017 (5 pages).

(Continued)

*Primary Examiner* — Janice N Tieu
(74) *Attorney, Agent, or Firm* — Osha Liang LLP

(57) ABSTRACT

There is provided an estimation device including an acquisition unit that acquires a channel estimation value for each combination of all of a plurality of combinations between a plurality of transmission antenna elements included in a base station and a plurality of reception antenna elements included in a mobile station; and an estimation unit that calculates a channel impulse response for each combination of all of the plurality of combinations between the plurality of transmission antenna elements and the plurality of reception antenna elements using the channel estimation values, and that estimates power delay profile by averaging, over all the combinations of the plurality of combinations between the plurality of transmission antenna elements and the plurality of reception antenna elements, power values for the (Continued)

respective combinations that are calculated from the calculated channel impulse responses for the respective combinations.

3 Claims, 13 Drawing Sheets

(51) Int. Cl.
    *H04B 7/10*     (2017.01)
    *H04L 27/26*     (2006.01)

(52) U.S. Cl.
    CPC ...... *H04L 25/0204* (2013.01); *H04L 25/0228* (2013.01); *H04L 25/0232* (2013.01); *H04L 27/26* (2013.01)

(56) References Cited

U.S. PATENT DOCUMENTS

| | | | |
|---|---|---|---|
| 2005/0255819 A1* | 11/2005 | Kawamoto | H04B 1/7113 455/277.1 |
| 2009/0131123 A1 | 5/2009 | Coersmeier et al. | |
| 2010/0081426 A1 | 4/2010 | Larsson et al. | |
| 2010/0172396 A1* | 7/2010 | Cairns | H04B 1/7113 375/148 |
| 2010/0260248 A1 | 10/2010 | Hung et al. | |

FOREIGN PATENT DOCUMENTS

| | | |
|---|---|---|
| EP | 2259465 A1 | 12/2010 |
| JP | 2005-354677 A | 12/2005 |
| JP | 2010-516166 A | 5/2010 |
| JP | 2014-199997 A | 10/2014 |

OTHER PUBLICATIONS

Written Opinion of the International Searching Authority issued in PCT/JP2017/009376 dated May 16, 2017 (4 pages).
"Docomo 5G white paper", Sep. 2014, NTT Docomo, Internet URL: https://www.nttdocomo.co.jp/corporate/technology/whitepaper_5g/ (27 pages).
Office Action issued in counterpart Japanese Patent Application No. 2016-048757, dated May 28, 2019 (5 pages).
Extended European Search Report issued in the counterpart European Patent Application No. 17763356.7, dated Jan. 31, 2019 (7 pages).

* cited by examiner

BASE STATION OF RELATED ART

Massive MIMO BASE STATION

FREQUENCY AND TIME MULTIPLEXING

SPREAD CODE MULTIPLEXING

ESTIMATION DEVICE

TECHNICAL FIELD

The present invention relates to an estimation device.

BACKGROUND ART

In long term evolution (LTE), a wireless communication scheme referred to as 5G has been studied to achieve larger capacity of systems, further acceleration of data transmission speeds, further reduction of latency in wireless sections, and the like. In 5G, various component technologies have been studied to satisfy the requirement that latency in a wireless section is set to be less than or equal to 1 ms while achieving a throughput that is greater than or equal to 10 Gbps.

In 5G, it is assumed to use a higher frequency band than that of LTE. Here, a propagation loss increases in a high frequency band. Therefore, to compensate for the increase in the propagation loss, it has been studied to apply massive multi input multi output (MIMO) in which beam forming of a narrow beam width is performed. Massive MIMO is large-scale MIMO in which many antenna elements (for example, 100 elements) are installed on a base station side. Since the strength of an electric field can be concentrated on a narrow region, interference between users can be decreased.

FIG. 1A illustrates an example of beam forming performed by a base station of the related art in LTE or the like. FIG. 1B illustrates an example of beam forming performed by a base station using massive MIMO. In the massive MIMO, as illustrated in FIG. 1B, wireless signals can be transmitted to distance locations through beam forming of a narrow beam width.

PRIOR ART DOCUMENT

Non-Patent Document

Non-Patent Document 1: NTT DOCOMO, INC. "DOCOMO 5G White Paper", September 2014

SUMMARY OF THE INVENTION

Problem to be Solved by the Invention

FIG. 2 illustrates an example of a case in which both base station and mobile station perform spatial multiplexing on two beams while performing beam forming. In massive MIMO, by performing a digital pre-coding process using channel information in MIMO communication in which a plurality of streams are used as in FIG. 2, it is possible to control interference between the streams with high precision. To calculate a pre-coding matrix used for the digital pre-coding process, channel information between a massive MIMO base station and a mobile station is generally necessary.

Here, for example, to interpolate channel estimation values of all the subcarriers from channel information estimated for subcarriers at constant intervals, there is known a method of using an interpolation filter calculated using a power delay profile. To ascertain characteristics or the like of a propagation path, there is known a method of calculating various kinds of statistical information (ascertaining a delay spread or frequency correlation of MIMO channels) using a power delay profile. The power delay profile is information indicating a statistical nature of a propagation path regarding a delay time and reception power of a signal.

As described above, the power delay profile can be used for various uses. However, when precision of the power delay profile is low, precision of various kinds of information calculated using the power delay profile may deteriorate.

The disclosed technology has been developed in view of the forgoing circumstance and an object is to provide a technology that allows to calculate, from channel information, a power delay profile with higher precision.

Means for Solving the Problem

An estimation device according to the disclosed technology includes an acquisition unit that acquires a channel estimation value for each combination of all of a plurality of combinations between a plurality of transmission antenna elements included in a base station and a plurality of reception antenna elements included in a mobile station; and an estimation unit that calculates a channel impulse response for each combination of all of the plurality of combinations between the plurality of transmission antenna elements and the plurality of reception antenna elements using the channel estimation values, and that estimates power delay profile by averaging, over all the combinations of the plurality of combinations between the plurality of transmission antenna elements and the plurality of reception antenna elements, power values for the respective combinations that are calculated from the calculated channel impulse responses for the respective combinations.

Advantage of the Invention

According to the disclosed technology, there is provided a technique that allows to calculate, from channel information, a power delay profile with higher precision.

EMBODIMENTS OF THE INVENTION

Hereinafter, embodiments of the invention are described with reference to the drawings. The embodiments to be described below are merely examples and embodiments to which the invention is applied are not limited to the following embodiments. For example, a wireless communication system according to the embodiments is assumed to be a system of a scheme conforming to LTE or 5G. However, the invention is not limited to LTE or 5G, but other schemes can also be applied.

In the following description, it is assumed that an estimation device that estimates a power delay profile is included in a mobile station, but the invention is not limited thereto. For example, the estimation device according to the embodiment can also be implemented in a server or the like.

<System Configuration>

Figure 1A:
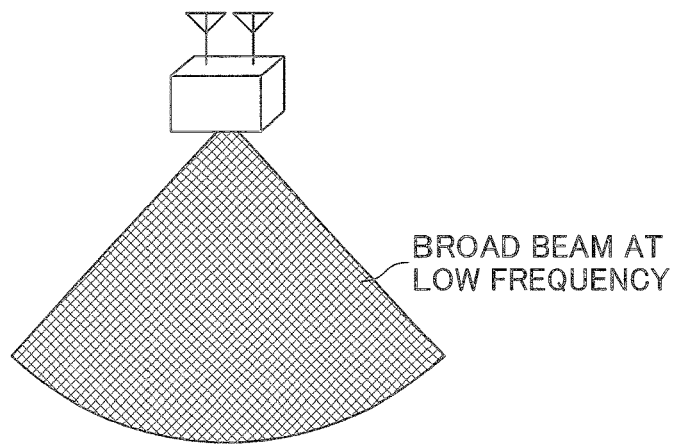
FIG. 1A is a diagram illustrating an example of beam forming.
Figure 1B:
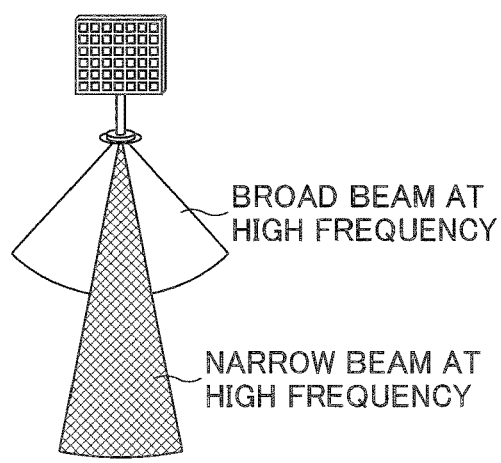
FIG. 1B is a diagram illustrating an example of beam forming performed by a base station that uses Massive MIMO.
Figure 2:
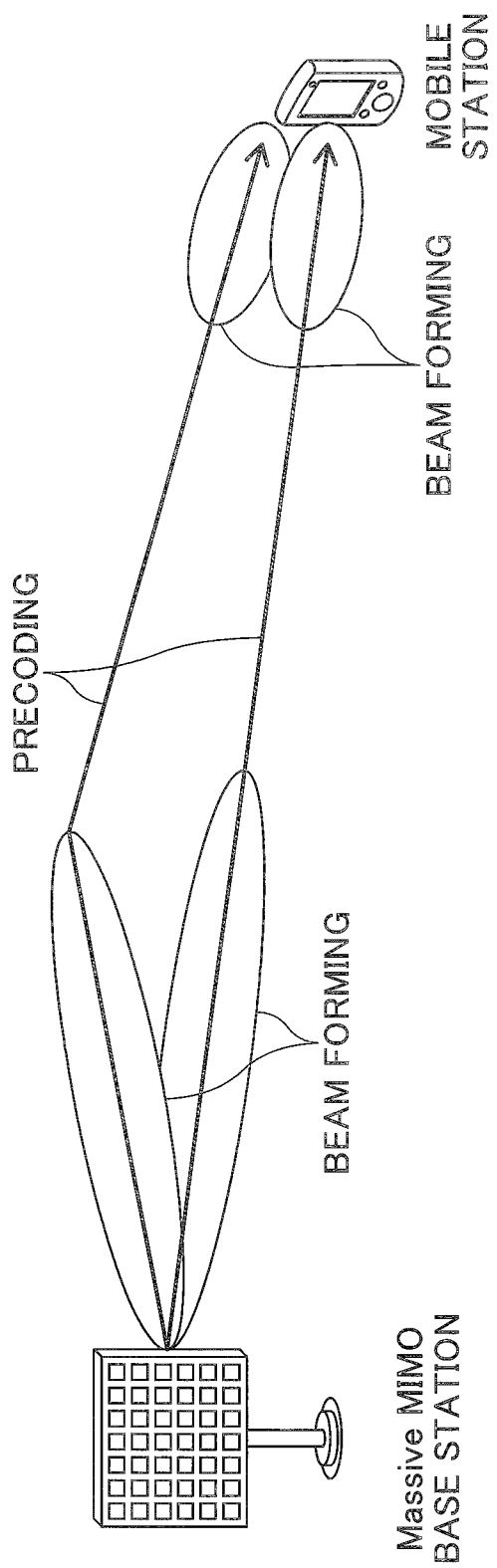
FIG. 2 is a diagram illustrating an example of a case in which communication is performed using two beams.
Figure 3:
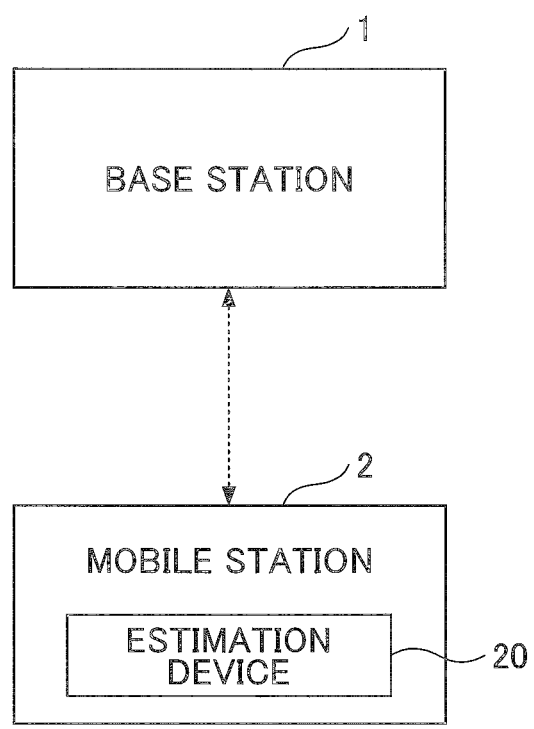
FIG. 3 is a diagram illustrating a configuration example of a wireless communication system according to an embodiment.

FIG. 3 is a diagram illustrating a configuration example of a wireless communication system according to an embodiment. The wireless communication system includes a base station 1 and a mobile station 2 that support massive MIMO (large-scale MIMO). The base station 1 includes many antenna elements and forms a massive MIMO cell (MM cell). The MM cell is intended to be a cell formed by many beams transmitted from the base station 1. In the MM cell, by using a band in which a bandwidth is 100 MHz or more at, for example, 5 GHz or more, it is possible to achieve communication faster than that of a macro cell.

The mobile station 2 includes a function for communicating with the base station 1. In FIG. 3, one mobile station 2 is illustrated. In the embodiment, however, two or more mobile stations 2 may be provided. The mobile station 2 includes an estimation device 20 that estimates a power delay profile.

<Functional Configuration>

(Base Station)

Figure 4A:
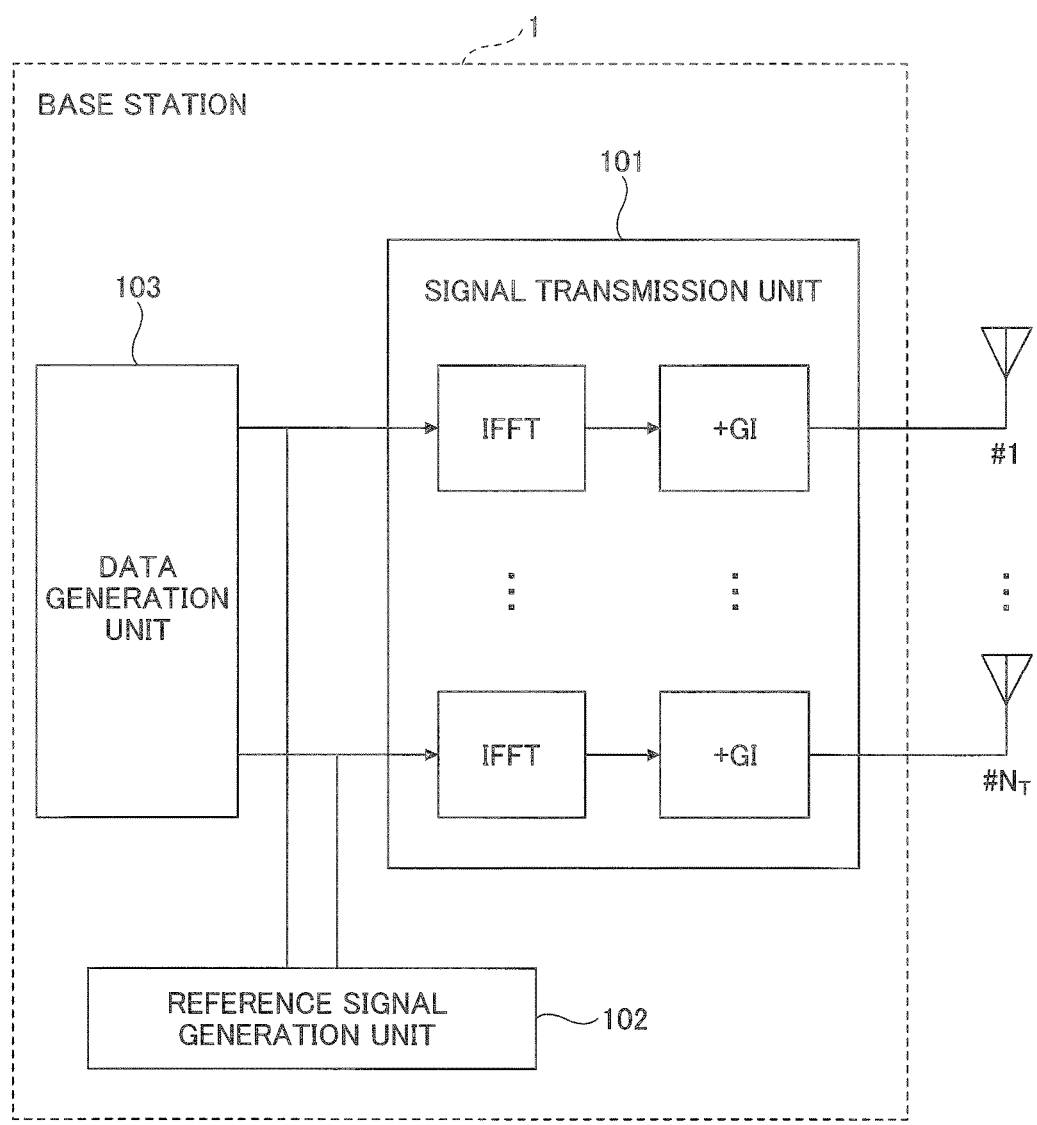
FIG. 4A is a diagram illustrating a functional configuration example of a base station according to the embodiment.

As illustrated in FIG. 4A, the base station 1 includes a signal transmission unit 101, a reference signal generation unit 102, and a data generation unit 103. FIG. 4A illustrates only main functional units according to the embodiment, and the base station 1 includes functions, which are not depicted, for performing operations conforming to the communication scheme used in the wireless communication system.

The signal transmission unit 101 has a function for wirelessly transmitting a reference signal generated by the reference signal generation unit 102. The signal transmission unit 101 has a function for performing a pre-coding process on user data generated by the data generation unit 103 to be transmitted on a plurality of streams.

The reference signal generation unit 102 has a function for generating reference signals, which are made orthogonal by the respective antenna elements included in the base station 1. The data generation unit 103 has a function for generating user data to be transmitted to the base station 2.

Figure 5A:
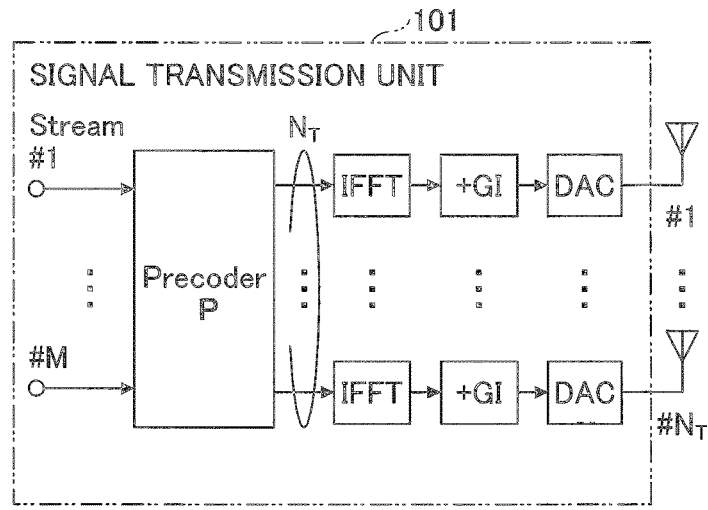
FIG. 5A is a diagram illustrating an example of a circuit configuration of a signal transmission unit of the base station for implementing BF.
Figure 5B:
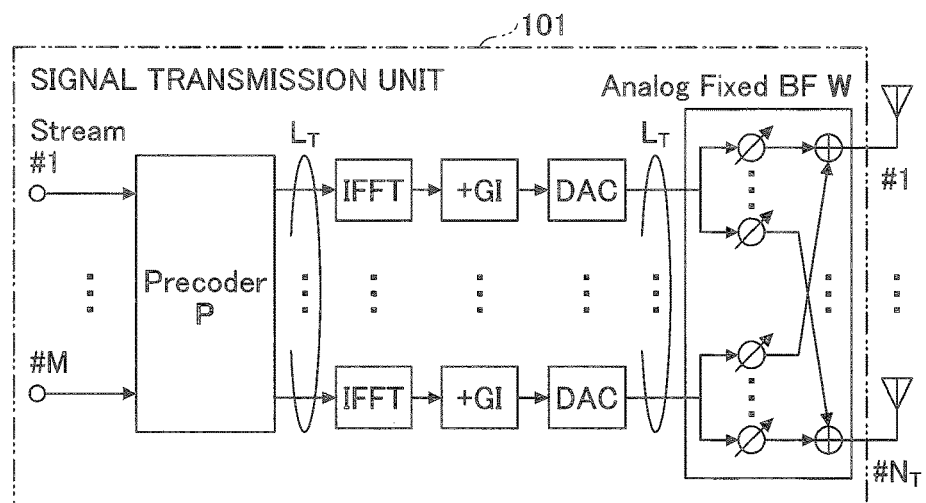
FIG. 5B is a diagram illustrating an example of the circuit configuration of the signal transmission unit of the base station for implementing the BF.

FIG. 5A and FIG. 5B illustrate a more detailed functional configurations of the signal transmission unit 101. FIG. 5A illustrates a functional configuration of a full-digital massive MIMO base station that includes the same number of digital analog converters (DAC) as the number ($N_T$) of transmission antenna elements and performs inverse fast Fourier transform (IFFT) and guard interval insertion of baseband signal processing by the number of transmission antennas. FIG. 5B illustrates a functional configuration of a hybrid massive MIMO base station in which only a beam forming (BF) process is achieved by a variable phase shifter in an analog circuit and which performs IFFT and guard interval insertion through digital signal processing. In the functional configurations of FIG. 5A and FIG. 5B, a precoder function that performs a precoding process is achieved through the digital signal processing.

(Mobile Station)

Figure 4B:
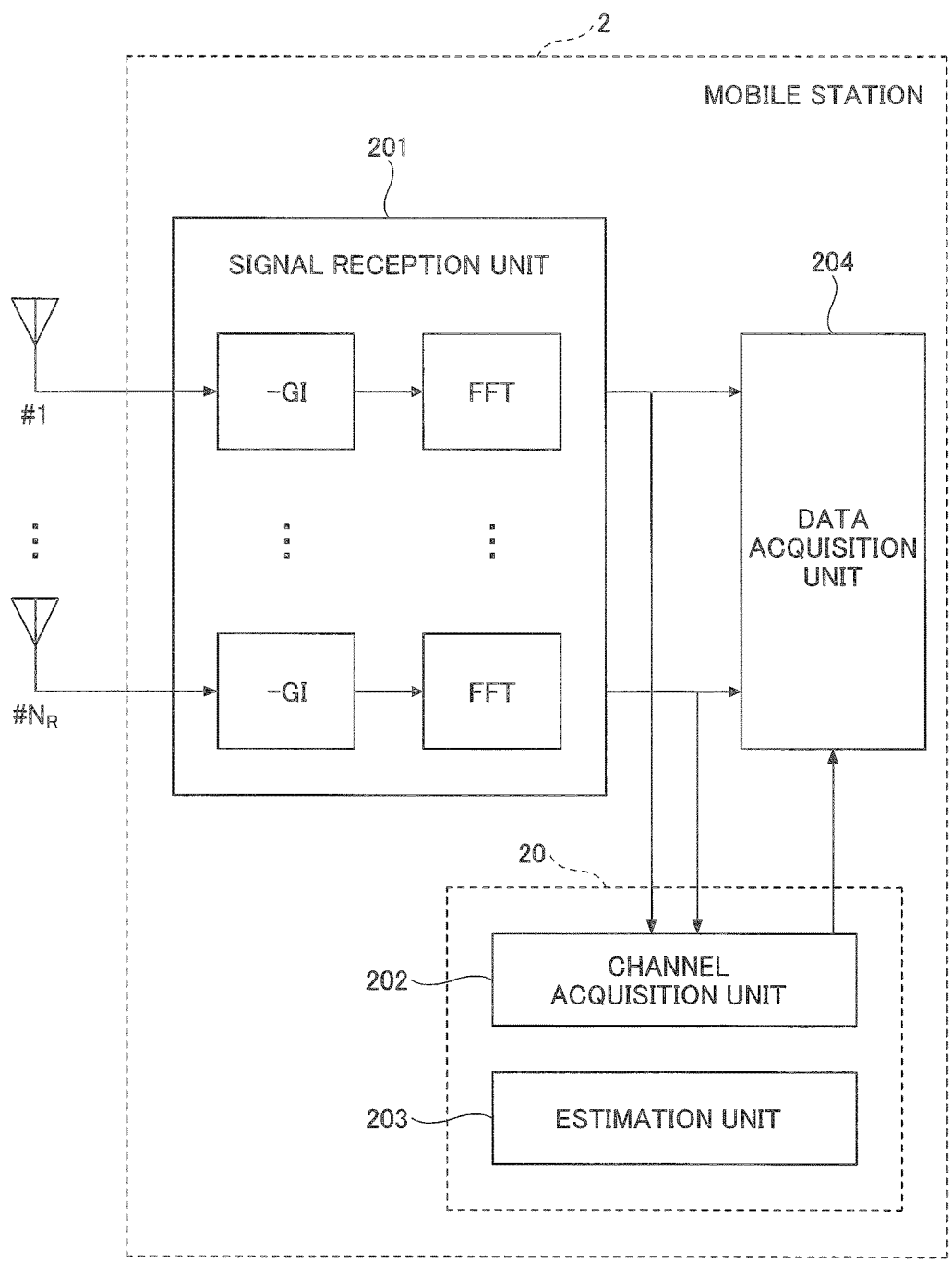
FIG. 4B is a diagram illustrating a functional configuration example of a mobile station according to the embodiment.

As illustrated in FIG. 4B, the mobile station 2 includes a signal reception unit 201, a channel acquisition unit 202, an estimation unit 203, and a data acquisition unit 204. FIG. 4B illustrates only main functional units according to the embodiment, and the mobile station 2 also includes functions, which are not depicted, for performing operation conforming to the communication scheme used in the wireless communication system.

The signal reception unit 201 receives a radio signal from the base station 1 and delivers the received signal to the channel acquisition unit 202 or the data acquisition unit 204.

The channel acquisition unit 202 has a function for acquiring a channel estimation value. The channel acquisition unit 202 may acquire a channel estimation value between a transmission antenna of the base station 1 and a reception antenna of the mobile station 2 by performing channel estimation using a reference signal received from the base station 1. When the estimation device 20 is implemented in a server or the like, the channel estimation value estimated by another apparatus (a mobile station or the like) may be acquired via a network.

The estimation unit 203 has a function for estimating a power delay profile based on the channel estimation value acquired by the channel acquisition unit 202. The estimation unit 203 may have a function for performing various estimation processes using the estimated power delay profile.

The data acquisition unit 204 has a function for acquiring various kinds of data (a control signal, user data, and the like) from signals received by the signal reception unit 201.

Figure 5C:
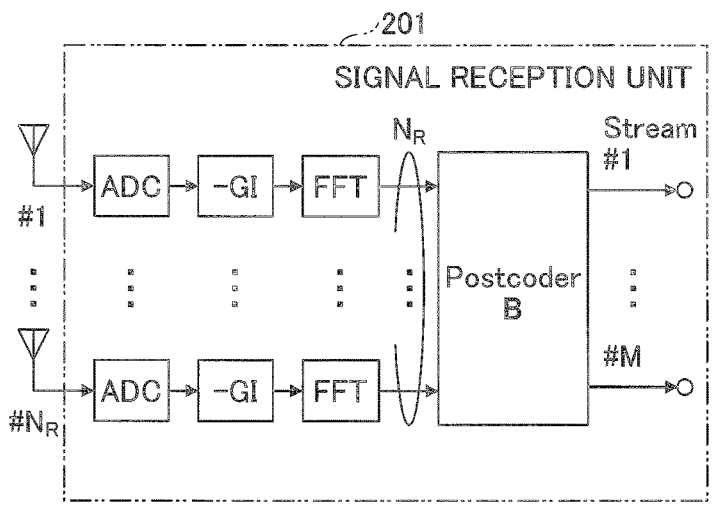
FIG. 5C is a diagram illustrating an example of a circuit configuration of a signal reception unit of the mobile station for implementing the BF.
Figure 5D:
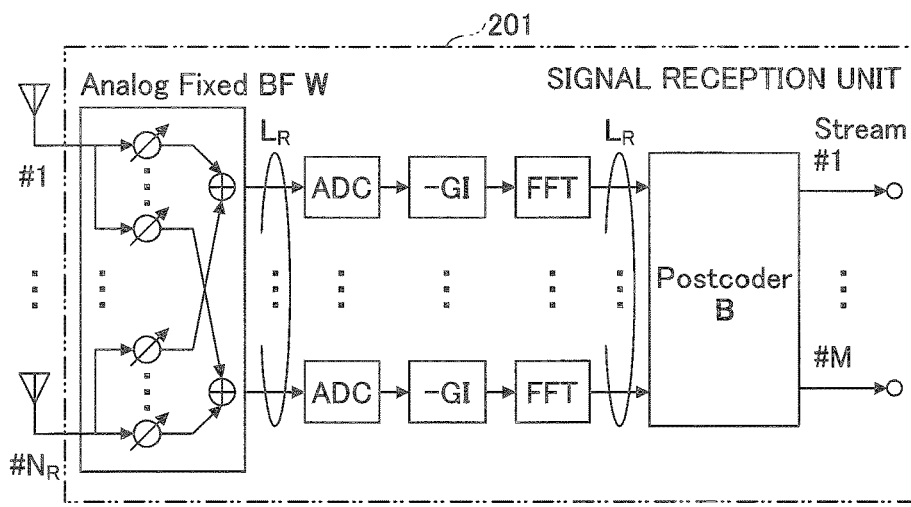
FIG. 5D is a diagram illustrating an example of the circuit configuration of the signal reception unit of the mobile station for implementing the BF.

FIG. 5C and FIG. 5D illustrate a more detailed functional configuration of the signal reception unit 201. FIG. 5C illustrates a functional configuration of a full-digital mobile station that includes the same number of analog digital converters (ADC) as the number ($N_R$) of reception antenna elements and performs guard interval removal of baseband signal processing and fast Fourier transform (FFT) by the number of reception antennas. FIG. 5D illustrates a functional configuration of a hybrid mobile station in which only a beam forming (BF) process is achieved by a variable phase shifter in an analog circuit and which performs guard interval removal and FFT through digital signal processing. In the functional configurations of FIG. 5C and FIG. 5D, a post-coder function that performs a post-coding process is achieved through the digital signal processing.

All of the functional configurations of the base station 1 and the mobile station 2 described above may be implemented by hardware circuits (for example, one IC chip or a plurality of IC chips), or some of the functional configurations may be formed of a hardware circuit and the other parts may be implemented by a CPU and a program.

(Base Station)

Figure 6A:
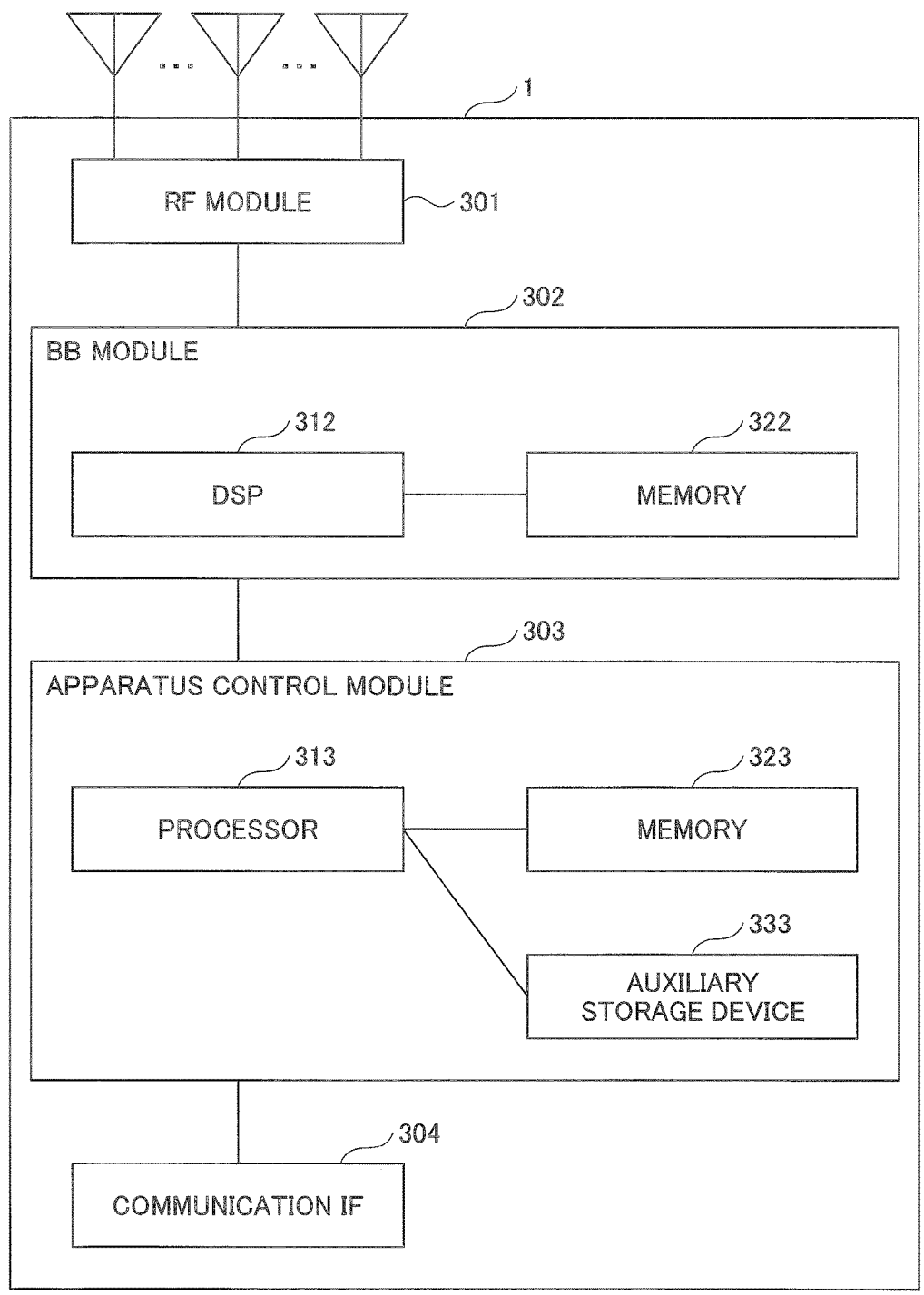
FIG. 6A is a diagram illustrating an example of a hardware configuration of the base station according to the embodiment.

FIG. 6 is a diagram illustrating examples of hardware configurations of a base station and a mobile station according to the embodiment. FIG. 6A illustrates a configuration closer to the implementation example of FIG. 4A. As illustrated in FIG. 6A, the base station 1 includes a radio frequency (RF) module 301 that performs a process on a wireless signal, a baseband (BB) process module 302 that performs baseband signal processing, an apparatus control module 303 that performs a process of a higher layer or the like, and a communication IF 304 that is an interface for connecting to a network.

The RF module 301 generates a wireless signal to be transmitted from an antenna by applying digital-to-analog (D/A) conversion, modulation, frequency conversion, power amplification, etc., to the digital baseband signal received from the BB processing module 302. The RF module 301 generates a digital baseband signal by applying frequency conversion, analog-to-digital (A/D) conversion, demodulation, etc., to the received wireless signal and delivers the digital baseband signal to the BB processing module 302. The RF module 301 includes, for example, a part of the signal transmission unit 101 illustrated in FIG. 4A.

The BB processing module 302 performs a process of converting an IP packet into a digital baseband signal, and vice versa. A digital signal processor (DSP) 312 is a processor that performs signal processing in the BB processing module 302. The memory 322 is used as a work area of the DSP 312. The BB processing module 302 includes, for example, a part of the signal transmission unit 101, the reference signal generation unit 102, and the data generation unit 103 illustrated in FIG. 4A.

The apparatus control module 303 performs protocol processing of an IP layer, operation and maintenance (OAM) processing, or the like. The processor 313 is a processor that performs a process performed by the apparatus control module 303. The memory 323 is used as a work area of the processor 313. An auxiliary storage device 333 is, for example, an HDD and stores various kinds of setting information for operating the base station 1.

Figure 6B:
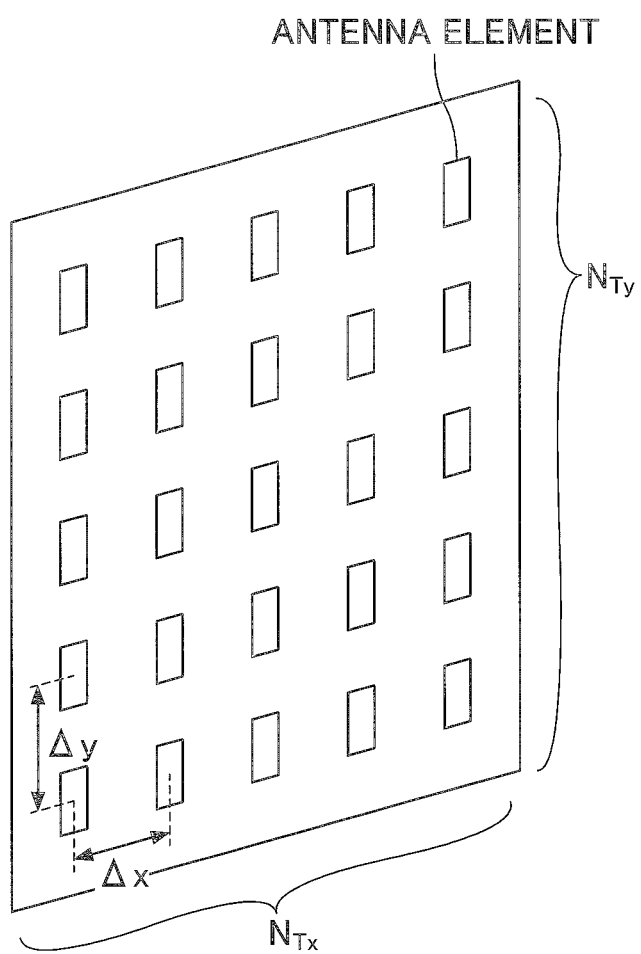
FIG. 6B is a diagram illustrating an example of a configuration of a transmission/reception antenna included in the base station according to the embodiment.

FIG. 6B illustrates a configuration example of a transmission and reception antenna included in the base station 1. The transmission and reception antenna of the base station 1 is configured to include many antenna elements disposed on a planar array. More specifically, $N_{Tx}$ antenna elements are disposed at a Δx interval in the horizontal direction of the planar array and $N_{Ty}$ antenna elements are disposed at a Δy interval in the vertical direction of the planar array. The number of antenna elements illustrated in FIG. 6B is merely an example. $N_{Tx}$ and $N_{Ty}$ may each be, for example, 10 elements (100 antenna elements in total). In addition, Δx and Δy may be, for example, half or more of a wavelength of a wireless signal to be transmitted.

(Mobile Station)

Figure 6C:
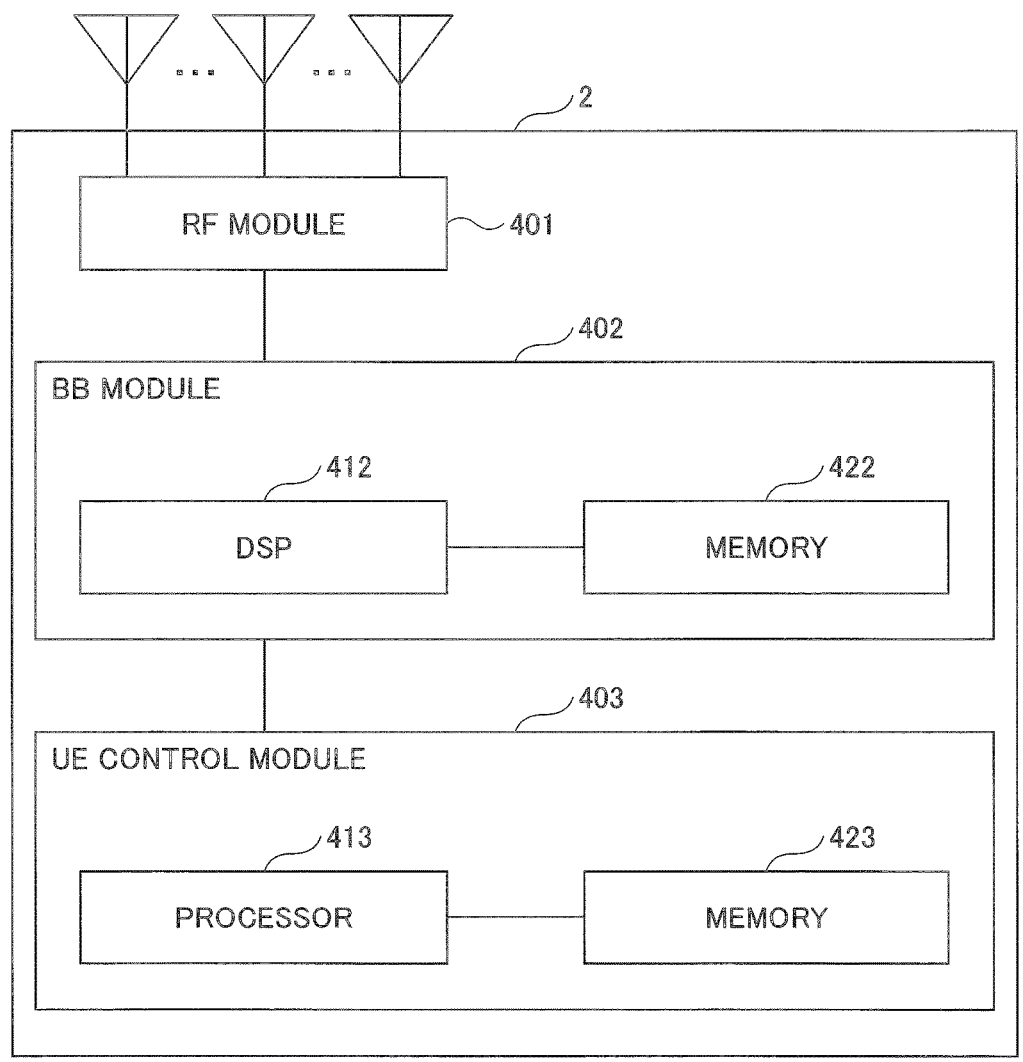
FIG. 6C is a diagram illustrating an example of a hardware configuration of the mobile station according to the embodiment.

FIG. 6C is a diagram illustrating an example of a hardware configuration of a mobile station according to the embodiment. FIG. 6C illustrates a configuration close to an implementation example than in FIG. 4B. As illustrated in FIG. 6C, the mobile station 2 includes an RF module 401 that performs a process on a wireless signal, a BB processing module 402 that performs baseband signal processing, and a UE control module 403 that performs a process of a higher layer.

The RF module 401 generates a wireless signal to be transmitted from an antenna by performing D/A conversion, modulation, frequency conversion, power amplification, or the like on a digital baseband signal received from the BB processing module 402. The RF module 401 generates a digital baseband signal by performing frequency conversion, A/D conversion, demodulation, or the like on a received wireless signal and delivers the digital baseband signal to the BB processing module 402. The RF module 401 includes, for example, a part of the signal reception unit 201 illustrated in FIG. 4B.

The BB processing module 402 performs a process of converting an IP packet into a digital baseband signal, and vice versa. A DSP 412 is a processor that performs signal processing in the BB processing module 402. The memory 422 is used as a work area of the DSP 412. The BB processing module 402 includes, for example, a part of the signal reception unit 201, a part of the channel acquisition unit 202, the estimation unit 203, and the data acquisition unit 204 illustrated in FIG. 4B.

The UE control module 403 performs protocol processing of an IP layer and processes of various applications. The processor 413 is a processor that performs a process performed by the UE control module 403. The memory 423 is used as a work area of the processor 413. The UE control module 403 includes, for example, the estimation unit 203 illustrated in FIG. 4B.

<Processing Procedure>

(Estimation of Power Delay Profile)

Next, a processing procedure when the mobile station 2 estimates a power delay profile is specifically described. The channel acquisition unit 202 acquires a plurality of channel estimation values, which are estimated from reference signals transmitted from the base station 1, for a plurality of combinations between a plurality of transmission antenna elements included in the base station 1 and a plurality of reception antenna elements included in the mobile station 2.

Figure 7A:
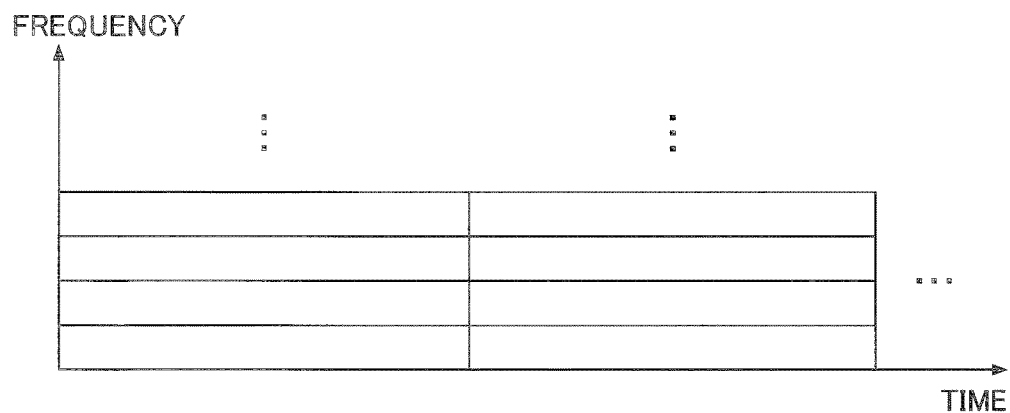
FIG. 7A is a diagram illustrating a reference signal multiplexing method.
Figure 7B:
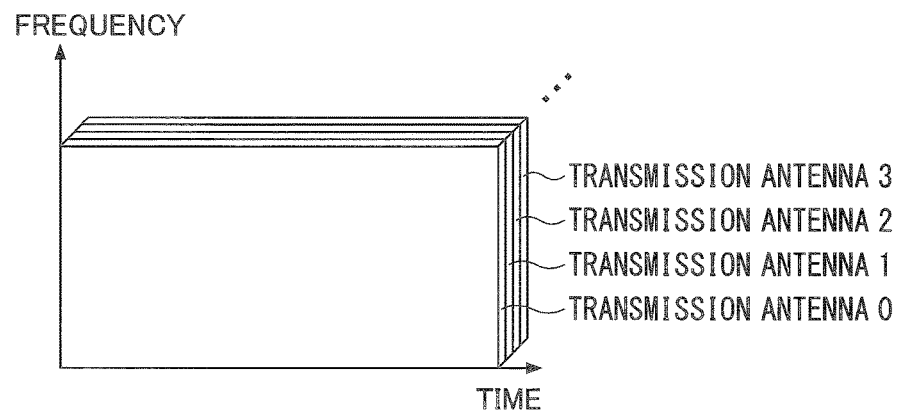
FIG. 7B is a diagram illustrating a reference signal multiplexing method.

Here, an example of a reference signal transmitted by the base station 1 according to the embodiment is illustrated in FIG. 7. The base station 1 transmits orthogonal reference signals from each antenna element. FIG. 7A illustrates an arrangement example in which orthogonal reference signals are multiplexed in the frequency and time directions for each antenna element. For example, in each region illustrated in FIG. 7A, a reference signal, which is made orthogonal, transmitted from one of the antenna elements is mapped. FIG. 7B illustrates an arrangement example in which reference signals, which are made orthogonal on an antenna element-by-antenna element basis, are spread code multiplexed.

In the embodiment, the base station 1 may transmit the reference signals with any method, provided that a plurality of channel estimation values for a plurality of combinations between the plurality of transmission antenna elements included in the base station 1 and the plurality of reception antenna elements included in the mobile station 2 can be obtained.

Subsequently, the estimation unit 203 calculates an estimated value of a channel impulse response of each of a plurality of combinations between the plurality of transmission antenna elements and the plurality of reception antenna elements using the plurality of channel estimation values.

First, the estimation unit 203 calculates the estimated value of the channel impulse response using Equation (1) below.

[Expression 1]

$$\tilde{h}_{n_R,n_T}(\tau) = \frac{1}{N}\sum_{n=0}^{N-1} \tilde{H}_{n_R,n_T}(n)\exp\left(j2\pi\tau\frac{n}{N}\right) \quad \text{Equation (1)}$$

$\tilde{H}_{n_R,n_T}$ ... channel estimated value between $n_T$-th transmission antenna and $n_R$-th reception antenna In Equation (1), "n" indicates a discrete frequency and "N" indicates a discrete Fourier transform length. Subsequently, the estimation unit 203 calculates a power value for each combination by squaring the estimated value of the channel impulse response for each combination of all the combinations between the plurality of transmission antenna elements and the plurality of reception antenna elements and estimates the power delay profile by averaging the calculated power values for the respective combinations (namely, by averaging each of the power values of the channel impulse responses obtained by the channel estimation values between respective antenna elements). Specifically, the estimation unit 203 calculates the power delay profile Pc(τ) of the power delay profile using Equation (2) to be indicated below.

[Expression 2]

$$\tilde{P}_c(\tau) = \sum_{\tau'=0}^{N-1}\left\{\frac{1}{N_T N_R}\sum_{n_T=0}^{N_T-1}\sum_{n_R=0}^{N_R-1}|\tilde{h}_{n_R,n_T}(\tau')|^2\right\}\delta(\tau-\tau') \quad \text{Equation (2)}$$

In Equation (2), "$N_T$" indicates the number of all transmission antenna elements of the base station 1 and "$N_R$" indicates the number of all reception antenna elements of the mobile station 2. "N" indicates a discrete Fourier transform length.

The method of estimating the power delay profile is described above. In LTE (including LTE-advanced) of the related art, the number of antenna elements included in a base station is small. Thus, it is highly likely that spatial correlation between the antennas between the base station and a mobile station becomes large, and estimation of the highly accurate power delay profile is difficult. However, a massive MIMO base station includes many antenna elements. Thus, it is possible to suppress spatial correlation between the antennas between the base station 1 and the mobile station 2 to be low. Accordingly, by averaging, for all the combinations between the plurality of transmission antenna elements and the plurality of reception antenna elements, the power values obtained from the channel estimation values between the respective antenna elements (for example, between all the transmission antennas and the reception antennas), a sufficient averaging effect can be obtained. Thus, the power delay profile can be highly accurately evaluated. Furthermore, in Equation (2), averaging is performed for all the transmission antennas and the reception antennas. However, if a large number of antenna elements (e.g., 100 or more antenna elements) is used, such as the case of the MassiveMIMO base station, averaging may be performed by selecting any number of the transmission/reception antennas, and, even in such a case, sufficient averaging effect can be obtained because the number of elements is large. As a method of selecting any number of transmission and reception antenna elements in this case, a method of selecting antennas with good channel estimation precision, a method of selecting antennas with low spatial correlation between the antennas, or a method of selecting antennas in accordance with a criterion based on a condition such as an antenna shape is considered.

<Operation Example in which Power Delay Profile is Used>

(Calculation of Delay Spread)

The estimation unit 203 can calculate a delay spread using the estimated power delay profile. Specifically, the delay spread can be calculated using Equation (3) below. In Equation (3), "rms" indicates a root-mean-square.

[Expression 3]

$$\tau_{rms} = \sqrt{\sum_{\tau=0}^{N-1}(\tau-\overline{\tau})^2 \tilde{P}_c(\tau)} \quad \text{provided,} \quad \text{Equation (3)}$$

$$\overline{\tau} = \sum_{\tau=0}^{N-1}\tau\tilde{P}_c(\tau)$$

(Interpolation of Channel Estimation Value)

Figure 8:
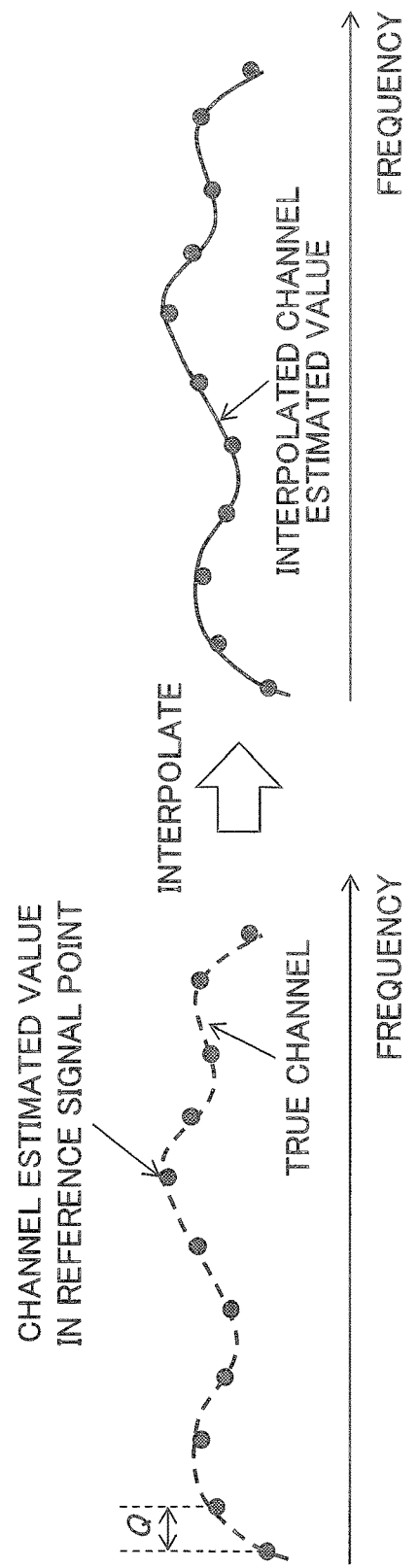
FIG. 8 is a diagram illustrating interpolation of channel estimation values.

When OFDM is used as a communication scheme, as illustrated in FIG. 8, channel estimation values of all the subcarriers can be interpolated from channel estimation values of respective subcarriers at constant intervals (Q subcarrier intervals) by using an interpolation filter calculated using the power delay profile. A specific calculation method at the time of interpolating the channel estimation values of all the subcarriers is described below.

Figure 9:
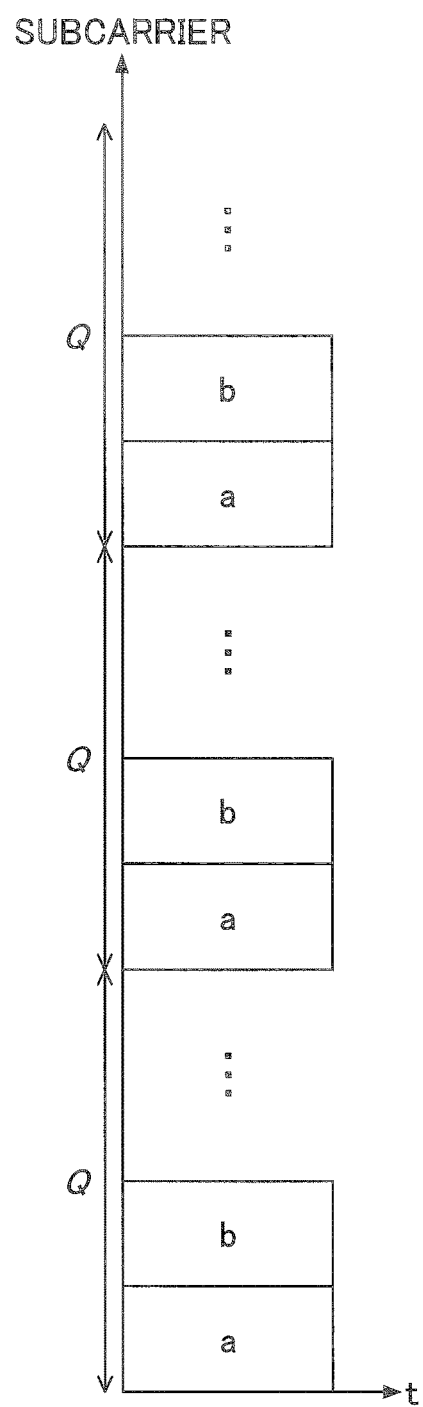
FIG. 9 is a diagram illustrating reference signals multiplexed at a Q subcarrier interval.

FIG. 9 illustrates an example of reference signals transmitted from a base station. In the present operation example, as illustrated in FIG. 9, it is assumed that the orthogonal reference signals for each transmission antenna element are repeatedly multiplexed in the frequency direction at the Q subcarrier interval to be transmitted. Note that, in FIG. 9, each of "a" and "b" represents a reference signal corresponding to the same antenna element. That is, when the number of antenna elements is 100, 100 orthogonal reference signals are multiplexed in each Q subcarrier interval. In FIG. 9, the reference signals are multiplexed in only the frequency direction, but the reference signals may be further multiplexed in the time direction. For example, when Q=5, the reference signals may be multiplexed in the time direction in such a manner that the reference signals of 1st to 5th antenna elements are transmitted at a certain timing and the reference signals of 6th to 10th antenna elements are transmitted at a subsequent timing. Here, "Q" may be any subcarrier spacing; however, in order to achieve highly accurate interpolation of the channel estimation values, "Q" may preferably be a number to the extent that frequency selectivity of the channels can be reproduced (a number to the extent that the sampling theorem is satisfied).

First, the channel acquisition unit 202 performs channel estimation for each combination between the plurality of transmission antenna elements and the plurality of reception antenna elements using the reference signals transmitted from the base station 1. A channel estimation value ($H_{n_R}$, $n_T$) of the Q subcarrier interval is represented by Equation (4) below.

[Expression 4]

$$\tilde{H}_{n_R,n_T} = [\tilde{H}_{n_R,n_T}(0 \cdot Q + m_{n_T}), \tilde{H}_{n_R,n_T}(0 \cdot Q + m_{n_T}) \ldots \tilde{H}_{n_R,n_T}((N_e-1)Q + m_{n_T})]T \quad \text{Equation (4)}$$

$m_{n_T} = n_T \bmod Q$ $\tilde{H}_{n_R,n_T}$ . . . channel estimated value of each Q subcarrier between $n_T$-th transmission antenna and $n_R$-th reception antenna In Equation (4), "$N_e$" corresponds to a number by which the orthogonal reference signals are repeated in the frequency direction to be transmitted. For example, when a reference signal of an antenna element "a" is repeatedly transmitted 50 times at the Q subcarrier interval in the entire band, $N_e = 50$.

Subsequently, the estimation unit 203 calculates the channel impulse response using the channel estimation values. The channel impulse response can be calculated with Equation (5) below. Equation (5) is an equation in which the channel estimation value of Equation (1) described above is replaced with a channel estimation value at the Q subcarrier interval.

[Expression 5]

$$\tilde{h}_{n_R,n_T}(\tau) = \frac{1}{N} \sum_{q=0}^{N_e-1} \tilde{H}_{n_R,n_T}(qQ + m_{n_T}) \exp\left(j2\pi\tau \frac{qQ + m_{n_T}}{N}\right) \quad \text{Equation (5)}$$

Subsequently, the estimation unit 203 calculates the power delay profile $PC(\tau)$, which is estimated by substituting the channel impulse response calculated using Equation (5) into Equation (2) described above.

Subsequently, the estimation unit 203 calculates an MMSE interpolation filter, for which a Minimum Mean Squared Error (MMSE: Minimum Mean Squared Error) norm is used, by using the estimated power delay profile $PC(\tau)$ and Equation (6) below.

[Expression 6]

$$W_{MMSE}(n) = \left\{E[H_{n_R,n_T} H_{n_R,n_T}^H] + \alpha I\right\}^{-1} E[H_{n_R,n_T}^*(n) H_{n_R,n_T}] \quad \text{Equation (6)}$$

$$\begin{cases} E[H_{n_R,n_T} H_{n_R,n_T}^H] = \begin{bmatrix} R_{0,0} & R_{0,1} & \cdots & R_{0,N_e-1} \\ R_{1,0} & R_{1,1} & \cdots & R_{1,N_e-1} \\ \vdots & \vdots & \ddots & \vdots \\ R_{N_e-1,0} & R_{N_e-1,1} & \cdots & R_{N_e-1,N_e-1} \end{bmatrix} \\ R_{q,q'} = \sum_{\tau=0}^{\tau_{max}-1} \tilde{P}_c(\tau) \exp\left(-2\pi\tau \frac{q-q'}{N}Q\right) \\ E[H_{n_R,n_T}^*(n) H_{n_R,n_T}] = [R_0(n) \quad R_1(n) \quad \ldots \quad R_{N_e-1}(n)]^T \\ R_q(n) = \sum_{\tau=0}^{\tau_{max}-1} \tilde{P}_c(\tau) \exp\left(-j2\pi\tau \frac{n-(qQ+m_{n_T})}{N}\right) \end{cases}$$

In Equation (6), E[ ] indicates an ensemble average. $\alpha I$ indicates a regularization parameter. "n" indicates a subcarrier. "$\tau_{max}$" indicates a maximum delay time of a channel.

Subsequently, the estimation unit 203 interpolates the channel estimation value of any subcarriers with Equation (7) below using the calculated MMSE interpolation filter. In Equation (7), "n" indicates any subcarrier. The estimation unit 203 can obtain channel estimation values in all the subcarriers of a band by interpolating the channel estimation values of the subcarriers in which the channel estimation values are not obtained by the reference signals in regard to all the subcarriers of the band with Equation (7).

[Expression 7]

$$\tilde{H}_{n_R,n_T}(n) = W_{MMSE}^T(n) \tilde{H}_{n_R,n_T} \quad \text{Equation (7)}$$

CONCLUSION

As described above, according to the embodiment, there is provided an estimation device including an acquisition unit that acquires a channel estimation value for each combination of all of a plurality of combinations between a plurality of transmission antenna elements included in a base station and a plurality of reception antenna elements included in a mobile station; and an estimation unit that calculates a channel impulse response for each combination of all of the plurality of combinations between the plurality of transmission antenna elements and the plurality of reception antenna elements using the channel estimation values, and that estimates power delay profile by averaging, over all the combinations of the plurality of combinations between the plurality of transmission antenna elements and the plurality of reception antenna elements, power values for the respective combinations that are calculated from the calculated channel impulse responses for the respective combinations. By the estimation device 20, there is provided a technology that allows to calculate, from the channel information, the power delay profile with higher precision.

The plurality of transmission antenna elements may be 100 or more antenna elements arranged on a planer array, and the 100 or more antenna elements may be arranged in a horizontal direction and in a vertical direction while spaced apart by an interval that is greater than or equal to a half-wavelength. As a result, the spatial correlation between the antennas of the base station 1 and the mobile station 2 can be suppressed to be low, and the power delay profile can be estimated with high precision.

In the estimation device according to claim 1 or 2, the estimation unit calculates a delay spread of a channel using the estimated power delay profile. In this manner, it is possible to calculate a delay spread using the power delay profile.

The channel estimation value is a channel estimation value for each of subcarriers arranged at predetermined subcarrier intervals, and the estimation unit interpolates a channel estimation value of a subcarrier in the predetermined subcarrier interval using an interpolation filter that uses a minimum mean squared error calculated from the power delay profile and the channel estimation value. Thus, it is possible to interpolate the channel estimation value for each subcarrier in the entire band from the channel estimation values obtained discretely from the reference signals at the predetermined subcarrier interval.

Supplements of Embodiments

As described above, the configuration of each apparatus (the communication apparatus 1/the base station 2) described in the embodiment of the invention may be achieved by causing a CPU (processor) to execute a program in the device including the CPU and a memory or may be achieved by hardware such as a hardware circuit including a logic of the process described in the embodiment. Alternatively, the program and the hardware may be mixed.

The embodiments of the present invention are described above, but the disclosed invention is not limited to the above embodiments, and those skilled in the art would appreciate various modified examples, revised examples, alternative examples, substitution examples, and so forth. In order to facilitate understanding of the invention, specific numerical value examples are used for description, but the numerical values are merely examples, and certain suitable values may be used unless as otherwise stated. The classification of items in the above description is not essential to the present invention. Matters described in two or more items may be combined and used as necessary, and a matter described in one item may be applied to a matter described in another item (provided that they do not contradict). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the sequences and flowcharts described in the embodiments, the order may be changed as long as there is no inconsistency. For the sake of convenience of processing description, the base station 1 and the mobile station 2 are described using the functional block diagrams, but such devices may be implemented by hardware, software, or a combination thereof. Software executed by the processor included in the base station 1 according to the embodiment of the present invention and software executed by the processor included in the mobile station 2 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Furthermore, each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

In the embodiments, the mobile station 2 is an example of the estimation device 20. The channel acquisition unit 202 is an example of the acquisition unit.

This international patent application is based upon and claims the benefit of priority of Japanese Patent Application No. 2016-048757 filed on Mar. 11, 2016, and the entire contents of Japanese Patent Application No. 2016-048757 are incorporated herein by reference.

LIST OF REFERENCE SYMBOLS

1 base station
2 mobile station
101 signal transmission unit
102 reference signal generation unit 102
103 data generation unit
201 signal reception unit
202 channel acquisition unit
203 estimation unit
204 data acquisition unit
301 RF module
302 BB processing module
303 apparatus control module
304 communication IF
401 RF module
402 BB processing module
403 UE control module

The invention claimed is:

1. An estimation device comprising:
a receiver that acquires a channel estimation value for each combination of all of a plurality of combinations between a plurality of transmission antenna elements included in a base station and a plurality of reception antenna elements included in a mobile station; and
a processor that:
  calculates a channel impulse response for each combination of all of the plurality of combinations between the plurality of transmission antenna elements and the plurality of reception antenna elements using each of the channel estimation values, and
  estimates an estimated power delay profile by averaging, over all the combinations of the plurality of combinations between the plurality of transmission antenna elements and the plurality of reception antenna elements, power values for the respective combinations that are calculated from the calculated channel impulse responses for the respective combinations,
wherein:
  the channel estimation values are a plurality of channel estimation values for subcarriers arranged at predetermined subcarrier intervals, and
  the processor interpolates at least one channel estimation value out of the plurality channel estimation values using an interpolation filter that uses a minimum mean squared error calculated from the estimated power delay profile and the at least one channel estimation value.

2. The estimation device according to claim 1, wherein the plurality of transmission antenna elements are 100 or more antenna elements arranged on a planer array, and
wherein the 100 or more antenna elements are arranged in a horizontal direction and in a vertical direction while spaced apart by an interval that is greater than or equal to a half-wavelength.

3. The estimation device according to claim 1, wherein the processor calculates a delay spread of a channel using the estimated power delay profile.

* * * * *